United States Patent [19]

Jameson et al.

[11] 4,358,371
[45] Nov. 9, 1982

[54] BACKWASHABLE FILTER

[75] Inventors: Dennis E. Jameson, Carlisle; David O. Richards, Wigton, both of England

[73] Assignee: British Sidac Limited, Watford, England

[21] Appl. No.: 251,802

[22] Filed: Apr. 7, 1981

[30] Foreign Application Priority Data

Apr. 22, 1980 [GB] United Kingdom ............... 8013158

[51] Int. Cl.³ .................................... B01D 29/38
[52] U.S. Cl. .................................. 210/415; 210/498; 210/485
[58] Field of Search ................. 210/413–415, 210/437, 445, 446, 453, 455, 484, 485, 497.1, 497.01, 498, 499

[56] References Cited

U.S. PATENT DOCUMENTS 2,910,183 10/1959 Hayes ............................ 210/498 X
3,016,984 1/1962 Getzin ......................... 210/497.01 X
3,511,374 5/1970 Beal .............................. 210/415 X
3,574,509 4/1971 Zentis et al. ................. 210/415 X
3,840,123 10/1974 McClure ....................... 210/415 X
4,178,246 12/1979 Klein ............................ 210/415 X Primary Examiner—Thomas G. Wyse
Attorney, Agent, or Firm—Sughrue, Mion, Zinn, Macpeak & Seas

[57] ABSTRACT

A backwashable filter includes a generally cylindrical housing, an inlet opening into the housing and an outlet opening from the housing, a cylindrical filter basket within the housing and arranged between the inlet and the outlet openings, and a backwashing arm bearing against the inside of the filter basket and being rotatable around the inside face of the filter basket. The filter basket comprises a perforated core a filter medium wrapped around the perforated core and a perforated flexible outer clamping band wrapped around the outside of the filter medium with tensioning means to apply tension to the clamping band to clamp the filter medium tightly against the perforated core. This clamping band constrains the filter medium and so prevents it flexing with rotation of the backwashing arm and this enhances its life. The performance of the filter is also increased since leakage of the liquid to be filtered around edges of the filter medium is more easily prevented particularly when split clamping rings are also provided.

15 Claims, 10 Drawing Figures

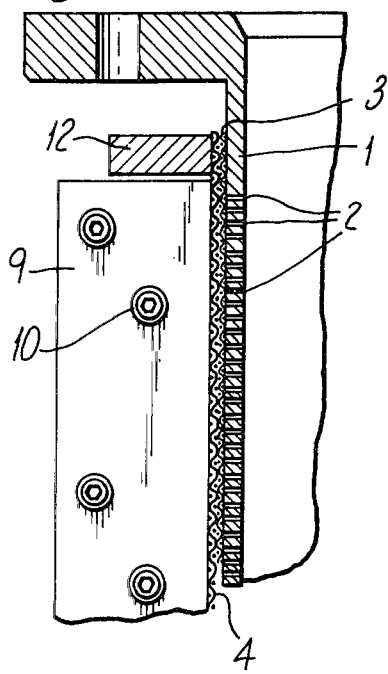
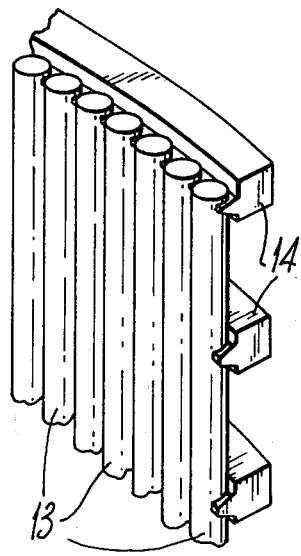
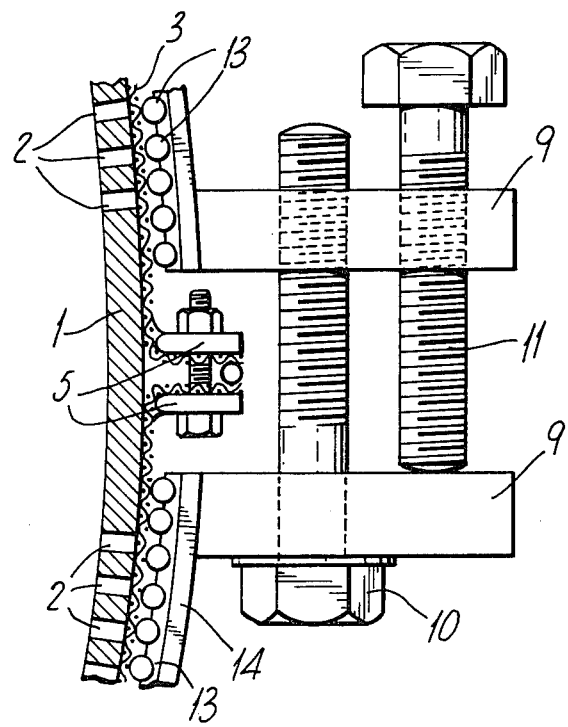

BACKWASHABLE FILTER

This invention relates to backwashable filters and, in particular, to backwashable filters capable of use in the filtration of viscose and other viscous liquids.

Backwashable filters have been used for filtering a variety of materials but they have found particular use in the filtration of viscose before it is extruded to form regenerated cellulose film or regenerated cellulose fiber. British patent specification No. 1,111,914 describes the general construction and use of such a filter and its application to the filtration of viscose. This specification shows a filter having a generally cylindrical housing with an inlet opening into the center of the housing and an outlet opening from the outside periphery of the housing. A cylindrical filter basket is located coaxially within the housing and arranged between the inlet and the outlet, and a backwashing arm is rotatably mounted about the central axis of the housing and bears against the inside face of the filter basket. In use, the liquid to be filtered is forced into the inside of the filter basket and then the liquid passes out through the filter basket into the space between the outside of the basket and the housing and then through the outlet. Debris filtered from the liquid is trapped in the filter basket. The backwashing arm is hollow and the part which bears against the inner face of the filter basket includes an elongated slot extending parallel to the axis of the housing. In use, the pressure inside the backwashing arm is less than the pressure in the space between the outside of the filter basket and the inside of the housing and, therefore, as the backwashing arm is rotated against the inside face of the filter basket, some of the filtered liquid passes in reverse flow through the filter basket and into the backwashing arm. In its reverse flow through the filter basket the filtered liquid carries with it the debris which has been trapped in the filter basket and so, as the backwashing arm is rotated, it continually backwashes the filter basket at the same time as the majority of the filter basket is being used for filtration.

This type of filter has met with considerable success but, in spite of that, it does possess several disadvantages which are particularly marked when it is used to filter viscose and other viscous liquids. The filter basket includes an inner and an outer cage between which the filter medium is located. In the past, the filter medium has usually been formed by a woven stainless steel wirecloth. The outer perforated cage is formed in two halves. It is important that the perforations in both the inner and the outer cages are aligned with one another so that the liquid to be filtered can pass through the filter basket. The way that the filter basket is prepared and the way that the alignment is achieved is described fully in British patent specification No. 1,111,914. The relative position of the inner and outer cages and that of the perforations in them depends upon the thickness of the filter medium positioned between them and therefore, the inner and outer cages have to be made and matched for one particular thickness of filter medium. Thus, for example, if it is desired to change the thickness of wirecloth to be used as the filter medium, and usually this occurs when it is desired to change the gauge of the wire cloth, a fresh filter basket has to be manufactured. When the inner and outer cages are perforated together in a single operation as disclosed in specification No. 1,111,914, this is a relatively awkward operation to perform using conventional machine tools in view of the relatively large size of the filter baskets and the large number of perforations which have to be machined into the cages.

In spite of the precautions mentioned in British patent specification No. 1,111,914, it is difficult to get an exact match between the inner and outer cages while allowing for the thickness of the filter medium between them and it has been found that, in practice, there is usually some clearance between the filter medium and the inner and outer cages. When the filter is being used, the differential pressure across the filter medium urges the filter medium against the inside of the outer cage. However, the portion of the wirecloth adjacent the backwashing arm, being subjected to a reverse flow of the filtered liquid, is urged against the outer surface of the inner cage. As the backwashing arm is continually rotating, this means that when there is any clearance between the inner and outer screens the wirecloth is being continually flexed and this leads to early failure of the wirecloth filter medium due to metal fatigue.

In view of the difficulty in matching the inner and outer cages with the thickness of the filter medium, it is difficult to ensure that a fluid-tight seal is formed around the top and bottom ends of the filter medium. Naturally any leakage of the material to be filtered around the top and bottom ends leads to this material being ineffectively filtered and so reduces the overall efficiency of the filter.

In general, filter media such as wirecloth are manufactured in the form of flat sheets and therefore, to form them into a cylinder so that they can be used with this type of filter, it is necessary to have at least one joint extending parallel to the axis of the filter.

Considerable difficulty has also been found in providing an effective seal along the joints in the filter material which extend in an axial direction as well as around both the top and bottom ends.

According to this invention a backwashable filter includes a generally cylindrical housing, an inlet opening into the housing and an outlet opening from the housing, a cylindrical filter basket within the housing and interposed between the inlet and outlet, and a backwashing arm bearing against the inside of the filter basket and being rotatable about the axis of the filter basket. The filter basket comprises a perforated core, a filter medium wrapped around the perforated core, and a perforated flexible outer clamping band wrapped around the outside of the filter medium with tensioning means to apply tension to the clamping band and thereby clamp the filter medium tightly against the perforated core.

Thus, as the filter medium is tightly clamped between the clamping band and the perforated core, it cannot flex during backwashing and this increases the life of the filter element. The filter element is wrapped around the perforated core and clamped in this position by the clamping band, and thus, it is possible to obtain a much tighter seal at the top and bottom ends of the filter medium and along the axial joint of the filter medium which reduces the amount of leakage of the unfiltered liquid past the filter element. Further, it is simple and straightforward to exchange a particular filter medium for one of different thickness since the outer clamping band accommodates a range of filter media of different thickness.

Preferably the filter basket includes clamping rings adjacent the top and bottom ends of the filter medium which are arranged to clamp the top and bottom ends of the filter medium against the perforated core to prevent any leakage of the liquid to be filtered around the top and bottom ends of the filter medium. The clamping rings may engage the filter media directly but preferably they bear against the outside of the clamping band. The top and bottom ends, and the axial joint of the filter medium may be impregnated with an impermeable sealant, for example a rubber latex composition, to ensure the integrity of the seals at the top and bottom ends and the axial joint.

The perforated flexible clamping band may include apertures similar to those in the perforated core but, in this case, it is preferred that the size and pitch of the apertures be different from that in the core so that there is a substantially constant overlap between the apertures in the clamping band and those in the core irrespective of the relative alignment between the two. It is preferred that the clamping band be made from a wire mesh or lattice work and have a largely open configuration. The band may be made by a combination of a wire mesh adjacent the filter medium to provide support for it and an outer lattice work support to provide the main structural strength of the clamping band.

When the clamping band is formed by a woven wire mesh, it is preferred that wires of the wire mesh which extend in an axial direction of the basket are precrimped into a serpentine shape and wires of the mesh which extend in a circumferential direction around the basket clamping band are substantially straight before being wrapped around the core and filter media. It has been found that when a typical woven wire mesh is used in which the wires extending in both of these directions have a serpentine configuration there is some give in the circumferential direction of the wire mesh when it is wrapped around the perforated core and this give allows some flexing of the filter medium. However, when the clamping band is made from a wire mesh having precrimped wires extending in the axial direction and straight wires in the direction which is, in use, the circumferential direction, the give in the circumferential direction is substantially eliminated and this enables the filter medium to be clamped more tightly against the perforate core.

When the clamping band is formed by or includes a lattice work, it may include a lattice work of substantially straight rods extending in the axial direction and connected to a number of outer spaced circumferentially extending bands or, alternatively, it may include an array of parallel circumferentially extending rings connected to a number of outer, axially extending rods.

The tensioning means preferably includes bars connected to axially extending edges of the clamping band and screwthreaded means associated with the bars to draw them together to apply tension to the clamping band and thereby clamp the clamping band tightly around the outside of the filter medium.

Particularly when the clamping band is made from a lattice work, it may be manufactured in two or more parts fixed together to form the complete band. This arrangement facilitates the manufacture of the band. Only a single tensioning means is necessary when the band is formed in two or more parts although tensioning means may be provided between the parts. The inner core may include one or more located pegs projecting outwards from it. In this case the filter medium and the clamping band are arranged to locate on this or these locating peg or pegs. Usually the pegs are located between the axially extending edges of the filter medium and the clamping band. The pegs define the location of the clamping band relative to the perforated core and also prevent rotation of the filter medium and the clamping band relative to the core.

Preferably the filter medium is an in-depth filter medium such as a sintered fleece of stainless steel fibers. With such an in-depth filter medium, debris is trapped throughout the thickness of the filter medium to provide it with a greater dirt holding capacity. It is also possible to provide a sandwich of a number of different layers of in-depth filter medium, one on top of the other and so increase the degree of fineness of filtration which can be achieved by the filter without limiting its throughput. When the filter basket includes a number of layers of different porosity, the larger particles tend to get trapped in the more porous layers whereas the finer particles pass through the more porous layers and are only trapped in the downstream, less porous layers. This means that the downstream less porous layers are not clogged prematurely by large particles of debris. The particular construction of the filter medium can thus be varied to suit a particular material which is to be filtered. With the filter constructed in accordance with this invention, while the filter basket can accommodate filter media having a wide range of thickness, in extreme cases it may be necessary to provide a clamping band which is longer or shorter.

It has been found using one example of a filter in accordance with this invention that we have been able to replace an existing three stage viscose filtration plant in which the first stage included a backwashing filter substantially as described in British patent specification No. 1,111,914 having a filter medium formed by 16 micron wirecloth, with a single stage filter including an in-depth filter medium. It has also been found that the volume of material used in the backwashing of the filter medium and withdrawn through the backwashing arm has been reduced from 50% to 8% while, at the same time, the throughput of the filter has been increased from 39 liters per minute to 70 liters per minute.

Particular examples of a filter in accordance with this invention will now be described with reference to the accompanying drawings; in which:

FIG. 4 is a part axial section through part of a first example of filter basket;

FIG. 5 is a perspective view of part of the clamping band used in the second example of filter basket;

FIG. 6 is a cross-section through the clamping arrangement of the second example of filter basket;

The basic construction and arrangement of a backwashing filter in accordance with this invention is substantially similar to that described in British patent specification No. 1,111,914 and will therefore not be discussed in detail. The filter differs only in the construction of its filter basket and examples of three different filter baskets will now be described.

Figure 3:
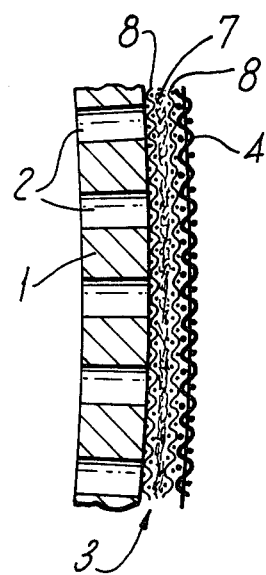
FIG. 3 is a scrap section through the first example of filter basket.

A first example of a filter basket includes a perforated cylindrical core 1 including holes 2, a filter medium 3, and a clamping band 4. An axially extending region of the core does not include any holes and axially extending edges of the filter medium 3 and clamping band 4 are arranged adjacent this unperforated region of the core 1. Also the top and bottom of the core 1 is unperforated. Metal edging strips 5 are fixed to the adjacent axially extending edges of the filter medium 3. The filter medium 3 is wrapped around the core 1 and the strips 5 are bolted together by nuts and bolts 6. The filter medium 3 is formed by a fleece of sintered stainless steel fibers 7 having wire mesh protection or support screens 8 on its opposite faces. One or both of the protection or support screens 8 may be sintered onto the fleece 7. This arrangement is clearly shown in FIG. 3 but in all other Figures the filter is simply shown as a wire cloth for clarity. The screens 8 provide protection for the fleece 7 and some mechanical strength for the filter medium 3.

Figure 1:
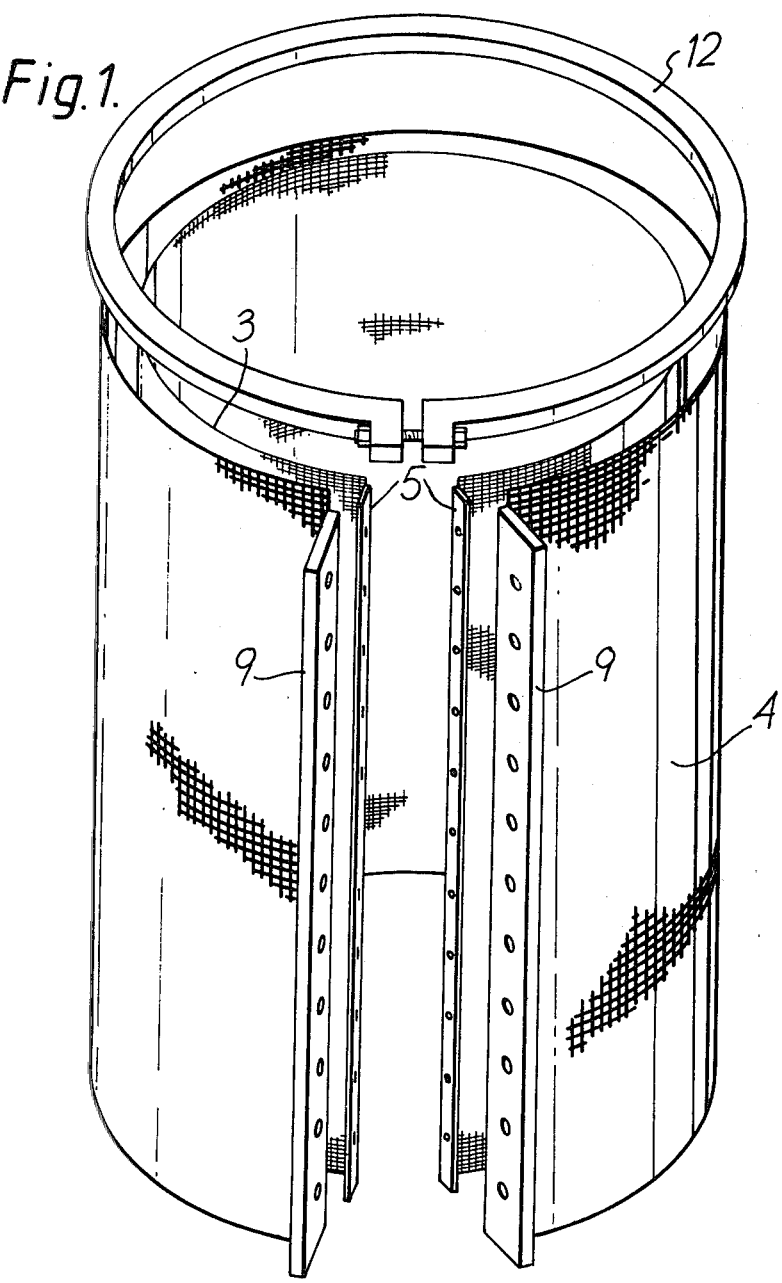
FIG. 1 is a diagrammatic perspective view of two parts of a first example of filter basket.
Figure 2:
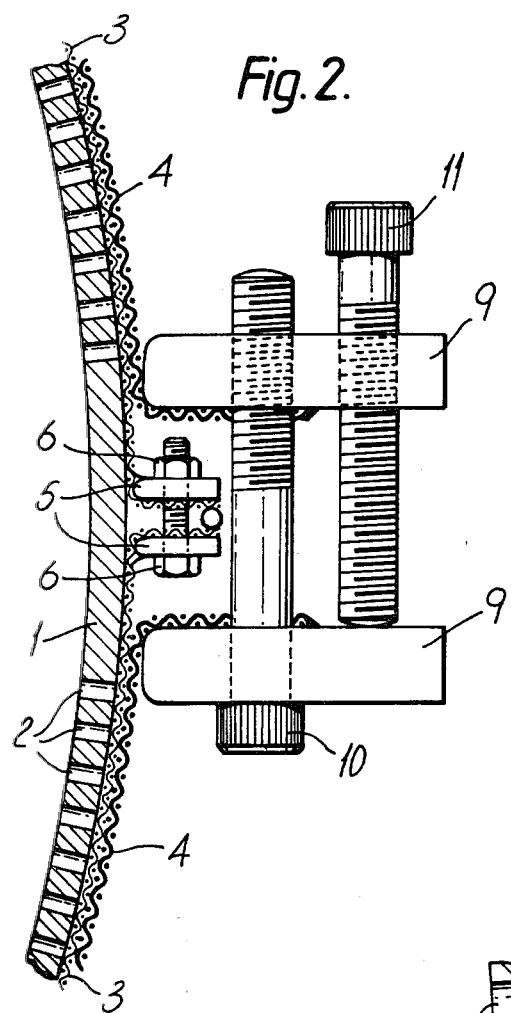
FIG. 2 is a section through a part of the first example of filter basket showing the clamping arrangement.

The clamping band 4 is formed from woven stainless steel wire mesh the wires of which extending in a direction parallel to the axial direction of the filter basket are precrimped into a serpentine shape whereas the wires of the mesh which extend around the filter basket are substantially straight before the clamping band is wrapped around the core. This is shown clearly in FIG. 3, but the conventional symbol is used in FIG. 2. Tensioning means including metal bars 9 and bolts 10 and 11 are used to apply tension to the clamping band 4. The bars 9 are welded to the axially extending edges of the clamping band 4. The clamping band 4 is wrapped around the core 1 and filter medium 3, and the clamping bars 9 are pulled together by the bolts 10 which pass through one of the bars 9 and are screwthreaded into the other bar 9. Further, the bolts 11 which are screwthreaded into the other of the bars 9 bear against one of the bars 9. The bolts 11 are then tightened, and the bolts 10 and 11 tightened in sequence to maintain the faces of the clamping bars 9 generally parallel. The bolts 10 are tightened to ensure that the clamping band 4 is tensioned to clamp the filter medium 3 tightly against the inner core 1.

The bars 9 do not extend to the top and bottom edges of the clamping band 4 and neither do the metal strips 5. Split clamping rings 12 are located adjacent both the top and bottom ends of the filter medium 3 and around the outside of the clamping band 4 to ensure that the top and bottom edges of the clamping band 4 and the filter medium 3 are clamped tightly against the core 1 and to prevent leakage of unfiltered liquid around the top and bottom ends of the filter medium 3.

Figure 7:
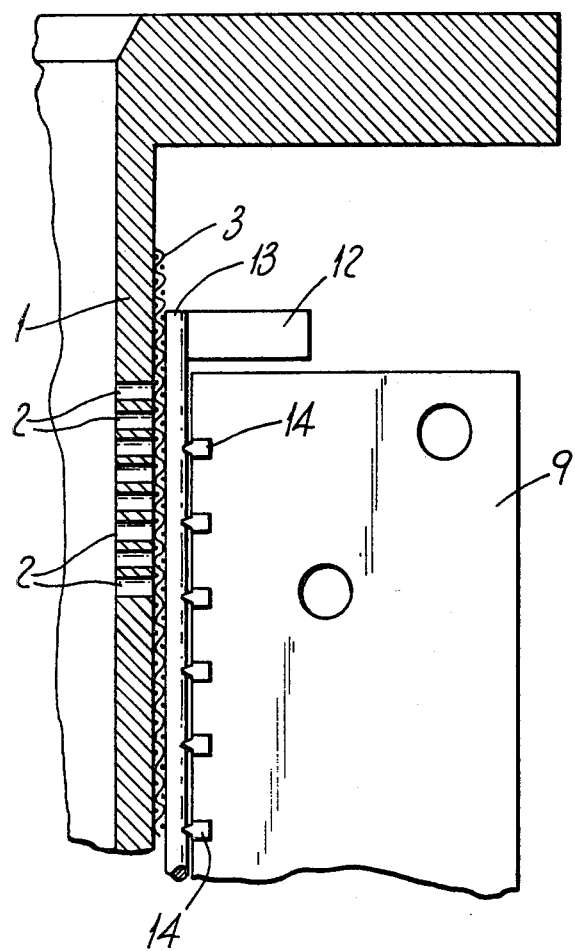
FIG. 7 is a vertical section through part of the second example of filter basket.

The second example, shown in FIGS. 5, 6 and 7, is generally similar to the first and similar parts have been given the same reference numbers. However, in this example, the clamping band 4 is made from a lattice work of axially extending round rods 13 supported by circumferentially extending rings 14. The axially extending rods 13 may have a wedge-shaped cross-section. The construction of the tensioning means for this example are substantially identical to those in the first example.

Figure 8:
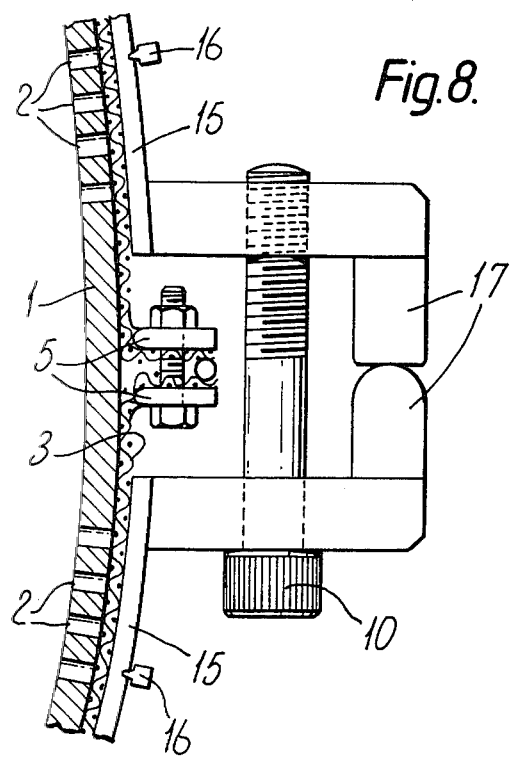
FIG. 8 is a cross-section through the clamping means of the third example of filter basket.
Figure 9:
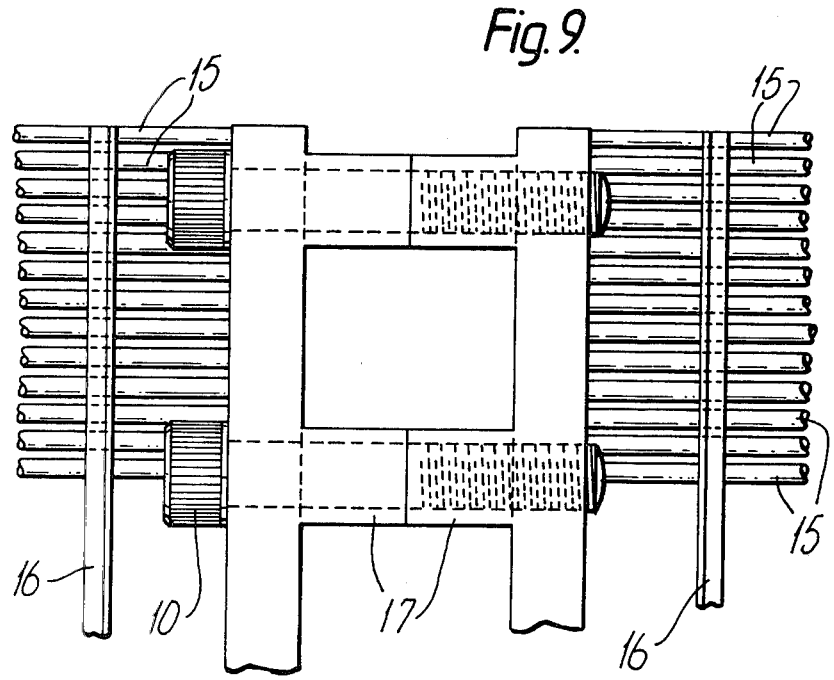
FIG. 9 is a side elevation of the clamping means of the third example.
Figure 10:
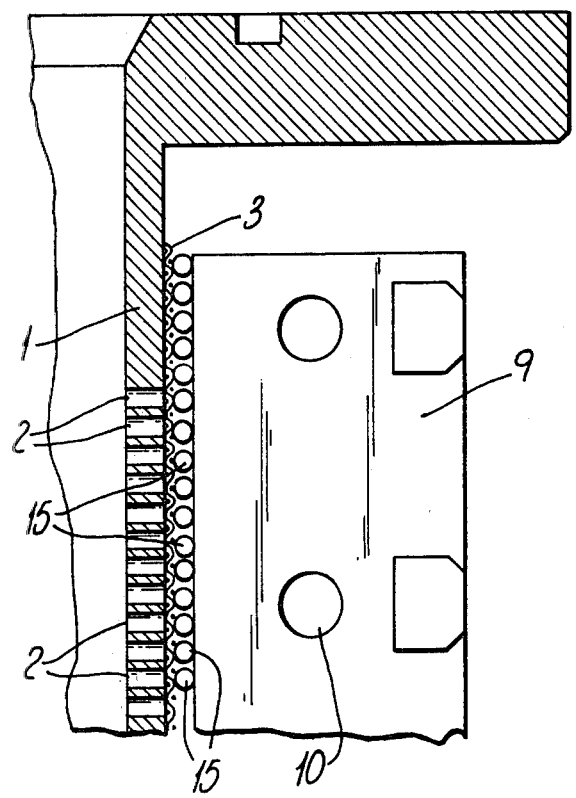
FIG. 10 is a vertical cross-section through the third example of filter basket.

The third example, shown in FIGS. 8, 9 and 10, is again generally similar to the second example but, in this case, the outer screen is formed by a lattice work of circumferentially extending round wires 15 held together by axially extending support bars 16. In this example the clamping bars 9 include fixed opposed pairs of projections 17 which replace the bolts 11. With this example the circumferentially extending round wires 15 form an effective seal at both the top and bottom ends of the clamping band and consequently separate split clamping rings 12 are not required.

We claim:
1. In a backwashable filter including a generally cylindrical housing, an inlet opening into said housing and an outlet opening from said housing, a cylindrical filter basket within said housing being interposed between said inlet and said outlet, and a backwashing arm bearing against an inside surface of said filter basket, said backwashing arm being rotatable about a vertical axis of said filter basket, the improvement wherein said filter basket comprises:
   a perforated core;
   a filter medium wrapped around said perforated core;
   a perforated flexible outer clamping band wrapped around an outside surface of said filter medium; and
   tensioning means connected to said flexible outer clamping band, said tensioning means applying tension to said clamping band to clamp said filter medium tightly against said perforated core.

2. The backwashable filter of claim 1, wherein said filter basket also includes clamping rings, said clamping rings being located adjacent top and bottom ends of said filter medium and being arranged to clamp said top and bottom ends of said filter medium against said perforated core whereby leakage of liquid to be filtered around said top and bottom ends of said filter medium is prevented.

3. The backwashable filter of claim 2, wherein said clamping rings bear against said clamping band.

4. The backwashable filter of claim 1; wherein said clamping band comprises a wire mesh having a largely open configuration.

5. The backwashable filter of claim 4, wherein said wire mesh comprises wires extending in an axial direction of said filter basket and wires extending in a circumferential direction of said filter basket, said axially extending wires being pre-crimped into a serpentine shape and said circumferentially extending wires being substantially straight before being wrapped around said filter medium and said core.

6. The backwashable filter of claim 1, wherein said clamping band comprises a lattice support having a largely open configuration.

7. The backwashable filter of claim 6, wherein said lattice support comprises substantially straight rods extending in an axial direction of said filter basket, and a plurality of spaced, outer circumferentially extending bands connected to said straight rods.

8. The backwashable filter of claim 6, wherein said lattice support comprises an array of parallel circumferentially extending rings and a plurality of axially extending rods arranged around the outside of said rings said rods being connected to outer faces of said rings.

9. The backwashable filter of claim 1, wherein said clamping band comprises a wire mesh adjacent said filter medium to provide support for said filter medium and an outer lattice support to provide structural strength for said clamping band.

10. The backwashable filter of claim 1, wherein said tensioning means comprises bars connected to axially extending edges of said clamping band, and screwthreaded means associated with said bars, said screwthreaded means drawing said bars together to tension said clamping band and clamp said clamping band tightly around said outside surface of said filter medium.

11. The backwashable filter of claim 1, wherein said filter medium comprises a sintered metal fiber fleece.

12. The backwashable filter of claim 1 further comprising second tensioning means for applying tension to said filter medium wrapped around said perforated core.

13. The backwashable filter of claim 12 wherein said second tensioning means comprises second bars connected to axially extending edges of said filter medium, and second screwthreaded means drawing said bars together to tension said filter medium and clamp said filter medium tightly around an outside surface of said perforated core.

14. The backwashable filter of claim 1 wherein said perforated core has first holes therein and said perforated clamping band has second holes therein, a size and pitch of said second holes being different from that of said first holes so that a substantially constant overlap is obtained between said first and said second holes irrespective of a relative alignment between said first and second holes.

15. In a backwashable filter including a generally cylindrical housing, an inlet opening into said housing and an outlet opening from said housing, a cylindrical filter basket within said housing being interposed between said inlet and said outlet, and a backwashing arm bearing against the inside of said filter basket and being rotatable about a vertical axis of said filter basket, the improvement wherein said filter basket comprises:
  a perforated core;
  a filter medium wrapped around said perforated core, said filter medium comprising a sintered metal fiber fleece and two wire mesh support screens, said wire mesh support screens being located on opposite faces of said sintered metal fiber fleece to sandwich said sintered metal fleece therebetween;
  a perforated flexible outer clamping band wrapped around an outside surface of said filter medium, said flexible outer clamping band being formed by a wire mesh having wires extending in an axial direction of said filter basket and wires extending in a circumferential direction of said filter basket, said axially extending wires being precrimped into a serpentine shape and said circumferentially extending wires being substantially straight before being wrapped around said filter medium and said core;
  tensioning means for applying tension to said flexible outer clamping band, said tensioning means comprising bars connected to axially extending edges of said clamping band, and screwthreaded means associated with said bars, said screwthreaded means drawing said bars together to tension said clamping band and clamp said clamping band tightly around said outside surface of said filter medium; and
  two split clamping rings, said clamping rings being located adjacent top and bottom ends of said filter medium and being arranged to clamp said top and bottom ends of said filter medium against said perforated core whereby leakage of liquid to be filtered around said top and bottom ends of said filter medium is prevented, said clamping rings bearing against said wire mesh forming said flexible outer clamping band.

* * * * *